United States Patent
Shiraishi

(10) Patent No.: US 12,528,485 B2
(45) Date of Patent: Jan. 20, 2026

(54) DRIVING SUPPORT DEVICE

(71) Applicant: TOYOTA JIDOSHA KABUSHIKI KAISHA, Toyota (JP)

(72) Inventor: Daisuke Shiraishi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 18/529,357

(22) Filed: Dec. 5, 2023

(65) Prior Publication Data

US 2024/0190454 A1 Jun. 13, 2024

(30) Foreign Application Priority Data

Dec. 9, 2022 (JP) ................................. 2022-196967

(51) Int. Cl.
  *B60W 50/08* (2020.01)
  *B60W 50/14* (2020.01)
(52) U.S. Cl.
  CPC .......... *B60W 50/087* (2013.01); *B60W 50/14* (2013.01)
(58) Field of Classification Search
  CPC ............................ B60W 50/087; B60W 50/14
  See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2015/0360685 A1 | 12/2015 | Uno | |
| 2017/0315551 A1* | 11/2017 | Mimura | B60W 30/143 |
| 2018/0208211 A1* | 7/2018 | Chiba | G08G 1/166 |
| 2019/0291747 A1* | 9/2019 | Chiba | G08G 1/00 |
| 2019/0295419 A1 | 9/2019 | Tosa et al. | |
| 2020/0239015 A1* | 7/2020 | Nishida | B60W 30/08 |

FOREIGN PATENT DOCUMENTS

| | | |
|---|---|---|
| JP | 2014-146122 A | 8/2014 |
| JP | 2020-121645 A | 8/2020 |

* cited by examiner

Primary Examiner — Kenneth M Dunne
(74) Attorney, Agent, or Firm — Sughrue Mion, PLLC

(57) ABSTRACT

The driving support device includes; a support controller; a storage device configured to store a definition of at least one prerequisite control; and a system controller configured to perform the at least one prerequisite control, wherein the support controller includes; acquiring information of a prerequisite control and a system state corresponding to the driving support control in response to an operation of a driver of a vehicle for starting the driving support control; determining whether the system state is enabled or disabled for each prerequisite control corresponding to the driving support control; requesting the driver to approve a change of the system state for the prerequisite control related to the system state determined not to match; and in response to obtaining approval from the driver, changing a system state of the prerequisite control related to the system state determined not to match and starting the driving support control.

5 Claims, 4 Drawing Sheets

| PREREQUISITE SYSTEM | PREREQUISITE SYSTEM | SYSTEM STATE |
|---|---|---|
| VEHICLE SPEED CONTROL | SIDESLIP CONTROL | ENABLE |
| | TIRE SLIP CONTROL | ENABLE |
| | COLLISION AVOIDANCE/REDUCTION | ENABLE |
| | DOWNHILL SUPPORT CONTROL | DISABLE |
| | TURN SUPPORT | DISABLE |
| | ... | ... |
| PRELIMINARY DRIVING SUPPORT | ... | ... |
| LANE FOLLOWING SUPPORT | ... | ... |
| CONGESTION SUPPORT | ... | ... |
| ADVANCED DRIVING SUPPORT | ... | ... |
| AUTOMATIC PARKING | ... | ... |
| ... | ... | ... |

*Fig.2*

| PREREQUISITE SYSTEM | PREREQUISITE SYSTEM | SYSTEM STATE |
|---|---|---|
| VEHICLE SPEED CONTROL | SIDESLIP CONTROL | ENABLE |
| VEHICLE SPEED CONTROL | TIRE SLIP CONTROL | ENABLE |
| VEHICLE SPEED CONTROL | COLLISION AVOIDANCE/REDUCTION | ENABLE |
| VEHICLE SPEED CONTROL | DOWNHILL SUPPORT CONTROL | DISABLE |
| PRELIMINARY DRIVING SUPPORT | TURN SUPPORT | DISABLE |
| LANE FOLLOWING SUPPORT | ... | ... |
| CONGESTION SUPPORT | ... | ... |
| ADVANCED DRIVING SUPPORT | ... | ... |
| AUTOMATIC PARKING | ... | ... |
| ... | ... | ... |

DRIVING SUPPORT DEVICE

CROSS-REFERENCE TO RELATED APPLICATIONS

This application claims the benefit of priority from Japanese Patent Application No. 2022-196967, filed on Dec. 9, 2022, the entire contents of which are incorporated herein by reference.

TECHNICAL FIELD

The present disclosure relates to driving support devices.

BACKGROUND

Japanese Patent Application Publication No. 2014-146122 discloses an apparatus for performing driving support control. This device is provided with a system for driving and controlling an anti-lock brake system for suppressing locking of wheels during braking, a system for driving and controlling a vehicle stability control system for suppressing side slip of a vehicle, and a system for driving and controlling a traction control which is a device for preventing idle rotation of wheels of the vehicle during starting or acceleration of the vehicle.

SUMMARY

In order to start the driving support control, it may be a prerequisite that other controls are in a state in which they can exert their functions. In the following description, bringing the control into a state in which the control can exert its function is referred to as enabling the control, and bringing the control into a state in which the control cannot exert its function is referred to as disabling the control. The other control that is a prerequisite for starting the driving support control is referred to as a prerequisite control. In general, the driving support control is not started when the prerequisite control is disabled. There is room for improvement to facilitate the use of driving support controls. The present disclosure provides a technique capable of suppressing a reduction in opportunities for driving support control to be used.

A driving support device according to an aspect of the present disclosure includes a support controller, a storage device, and a system controller. The support controller performs driving support control. The storage device is connected to the support controller and stores a definition of at least one prerequisite control that is a prerequisite for starting the driving support control. The definition includes at least one prerequisite control and a system state of the at least one prerequisite control. The system state is either enabled or disabled. The system controller performs at least one prerequisite control. The support controller is configured to acquire information of the prerequisite control and the system state corresponding to the driving support control based on the definition, determine whether the system state is enabled or disabled for each prerequisite control corresponding to the driving support control based on a signal from the system controller, determine whether the determined system state matches the defined system state, request the driver to approve a change in the system state of the prerequisite control corresponding to the system state determined not to match, change the system state of the prerequisite control corresponding to the system state determined not to match, and start the driving support control.

According to this driving support device, information of prerequisite control and the system state corresponding to the driving support control are acquired based on the definition in response to the operation of the driver for starting the driving support control. Then, it is determined whether the system state is enabled or disabled for each support control corresponding to the driving prerequisite control based on a signal from the system controller. A determination is made as to whether the determined system state matches the defined system state. The driver is requested to approve the change of the system state with respect to the prerequisite control related to the system state determined not to match. In response to the approval from the driver, the system state of the prerequisite control related to the system state determined not to match is changed, and the driving support control is started. As described above, when the system state of the prerequisite control does not match the condition for starting the driving support control, the driver can be requested to approve the change of the system state. The driving support device can start the driving support control when the driving gap device receives the approval of the change of the system state. Therefore, the driving support device can suppress a reduction in the opportunity to use the driving support control.

According to the present disclosure, there is provided a technique capable of suppressing a reduction in opportunities to use driving support control.

BRIEF DESCRIPTION OF THE DRAWINGS

FIG. 2 is an example of information stored in a prerequisite system DB.

DETAILED DESCRIPTION

Hereinafter, embodiments of the present invention will be described with reference to the drawings.

Figure 1:
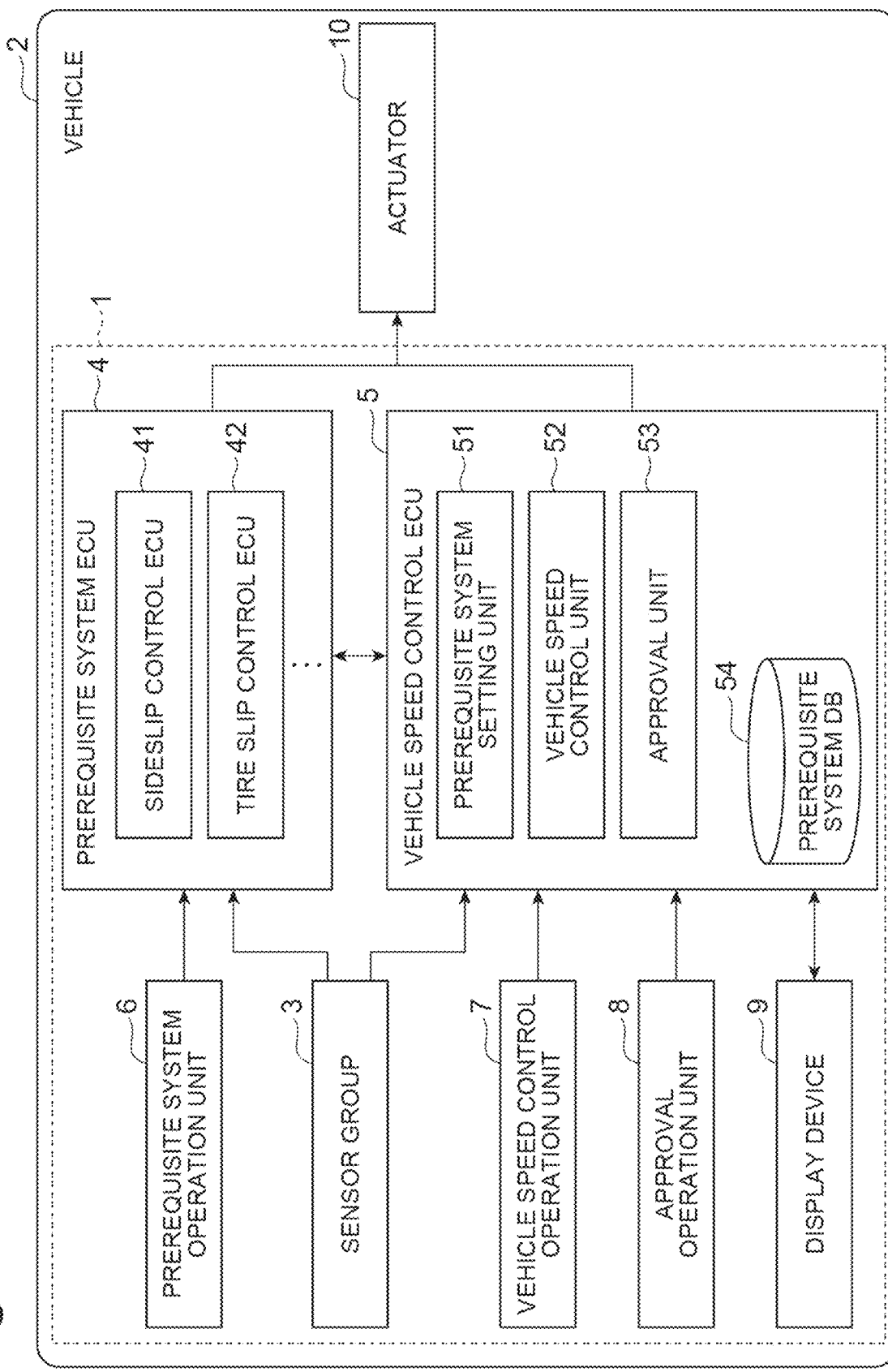
FIG. 1 is a block diagram illustrating a driving support device according to an embodiment of the present invention.

FIG. 1 is a block diagram illustrating a driving support device according to an embodiment of the present invention. As shown in FIG. 1, a driving support device 1 is mounted on a vehicle 2 as an example. The vehicle 2 may be, for example, an autonomous driving vehicle that travels in autonomous driving. The driving support device 1 is configured to perform various driving support controls. Hereinafter, as an example, a case in which the driving support device 1 provides vehicle speed control will be described, but driving support control is not limited to vehicle speed control.

The driving support device 1 includes a sensor group 3, a prerequisite system electronic control unit (ECU) 4, and a vehicle speed control ECU 5. The ECU is an electronic control unit including a central processing unit (CPU), a read only memory (ROM), a random-access memory (RAM), a controller area network (CAN) communication circuit, and the like. A prerequisite system ECU 4 may be an ECU that integrates a plurality of ECUs. The prerequisite system ECU 4 is an example of a system controller, and the vehicle speed control ECU 5 is an example of a support controller.

The sensor group 3 comprises at least one sensor. The sensor is, for example, an external sensor, a GPS receiving unit, or an internal sensor. The external sensor is a detection device that detects a situation around the vehicle 2. The external sensor may include at least one of a camera and a radar sensor. The internal sensor is a detection device that detects a travel state of the vehicle 2. The internal sensor may include at least one of a vehicle speed sensor, an acceleration sensor, and a yaw rate sensor.

The prerequisite system ECU 4 is connected to the sensor group 3 and includes at least one prerequisite system. The prerequisite system is a system that controls the behavior of the vehicle 2. The prerequisite system may be one system or may be a plurality of systems. It is predetermined that the prerequisite system is effective as a prerequisite for starting the vehicle speed control. Hereinafter, the control executed by the prerequisite system is also referred to as prerequisite control. A state in which a control or system can perform its function is referred to as enabling the control or system, and a state in which the control or system cannot perform its function is referred to as disabling the control or system. As described above, the prerequisite system of the vehicle speed control is determined in advance, and the vehicle speed control can be started on condition that all prerequisite systems are enabled.

The prerequisite system ECU 4 includes, by way of example, a sideslip control ECU 41 and a tire slip control ECU 42. The sideslip control ECU 41 performs, for example, VSC (Vehicle Stability Control) which is control for stabilizing the car by controlling force applied to four wheels. The tire slip control ECU 42 performs a traction control system (TRC) which is a control for suppressing idling of the tire at the time of starting and acceleration. The illustrated ECU is an example and the prerequisite system ECU 4 may be configured to include another ECU. The prerequisite system ECU 4 is connected to a prerequisite system operation unit 6. The prerequisite system operation unit 6 receives an operation of a driver for switching between enabling and disabling of the prerequisite system. The prerequisite system operation unit 6 is, for example, a user interface such as a button or a touch panel. The prerequisite system ECU 4 has a function of switching between enabling and disabling of the prerequisite system in accordance with the operation of the driver received by the prerequisite system operation unit 6. The prerequisite system ECU 4 has a function of switching between enabling and disabling of the prerequisite system in accordance with a signal output from the vehicle speed control ECU 5 described later.

The vehicle speed control ECU 5 is connected to the sensor group 3 and the prerequisite system ECU 4 and includes a prerequisite system setting unit 51, a vehicle speed control unit 52, an approval unit 53, and a prerequisite system DB 54. The prerequisite system DB 54 is an example of a storage device.

The vehicle speed control unit 52 performs vehicle speed control of the vehicle 2. The vehicle speed control includes behavior control or follow-up control in the front-rear direction. The vehicle speed control unit 52 operates an actuator 10 of the vehicle 2 based on the detection result of the sensor group 3 to perform vehicle speed control. The actuator 10 includes, for example, a drive actuator and a brake actuator. The vehicle speed control unit 52 starts the vehicle speed control in response to the operation of the driver of the vehicle 2 for starting the vehicle speed control. For example, a vehicle speed control operation unit 7 receives an operation of the vehicle 2 driver for starting vehicle speed control. The vehicle speed control operation unit 7 is, for example, a user interface such as a button or a touch panel.

The prerequisite system setting unit 51 determines whether the prerequisite system is enabled prior to vehicle speed control by the vehicle speed control unit 52. For example, the prerequisite system setting unit 51 acquires information of a prerequisite system of the vehicle speed control and a system state of the prerequisite system in response to the vehicle speed control operation unit 7 receiving an operation of a driver of the vehicle for starting the vehicle speed control.

FIG. 2 is an example of information stored in a prerequisite system DB. As shown in FIG. 2, the prerequisite system DB 54 stores information that defines prerequisite system of vehicle speed control. The prerequisite system DB 54 stores a driving support system, a prerequisite system that is a prerequisite of the driving reservation system, and a system state in association with each other. The system state is either enabled or disabled. In the example of FIG. 2, when the driving support system is "vehicle speed control", the prerequisite system and the system state thereof are "sideslip control enabled", "tire slip suppression enabled", "collision avoidance mitigation enabled", "downhill support control disabled", and "turn support disabled". In addition to "vehicle speed control", the prerequisite system DB 54 may store information related to driving support systems such as "preliminary driving support", "lane following support", "congestion support", "advanced driving support", and "automatic parking" and information related to these prerequisite systems.

The prerequisite system setting unit 51 determines whether the system state is enabled or disabled for each prerequisite control corresponding to the vehicle speed control based on a signal from the prerequisite system ECU 4 for the prerequisite system acquired from the prerequisite system DB 54. The prerequisite system setting unit 51 then determines whether the determined system state, i.e., the current system state, matches the defined system state. When the current system state does not match the defined system state, the prerequisite system does not satisfy the condition for starting the vehicle speed control.

The approval unit 53 accepts the driver when the prerequisite system setting unit 51 determines that the current system state and the defined system state do not match. The approval unit 53 requests the driver to approve the change of the system state for the prerequisite system related to the system state determined not to match. For example, a display device 9 is connected to the vehicle speed control ECU 5. The display device 9 is a monitor, a touch panel, or the like. The approval unit 53 causes the display device 9 to display an icon, message, image, or the like requesting approval.

The vehicle speed control ECU 5 is connected to an approval operation unit 8. The approval operation unit 8 receives the operation of the driver for approving the change of the system state of the prerequisite system. The approval operation unit 8 is, for example, a user interface such as a button or a touch panel. The approval operation unit 8 may be integral with the display device 9 when the display device 9 is a touch panel. The prerequisite system setting unit 51 confirms the presence or absence of approval according to the operation of the driver accepted by the approval operation unit 8, and changes the system state of the prerequisite system when the approval is made. Thereafter, the vehicle speed control unit 52 starts vehicle speed control. The vehicle speed control unit 52 does not initiate vehicle speed control if unapproved.

The vehicle speed control ECU 5 may notify the display device 9 that the vehicle speed control is started based on the approval, that the system state of the prerequisite system does not match the start condition of the vehicle speed control, or the like.

Figure 3:
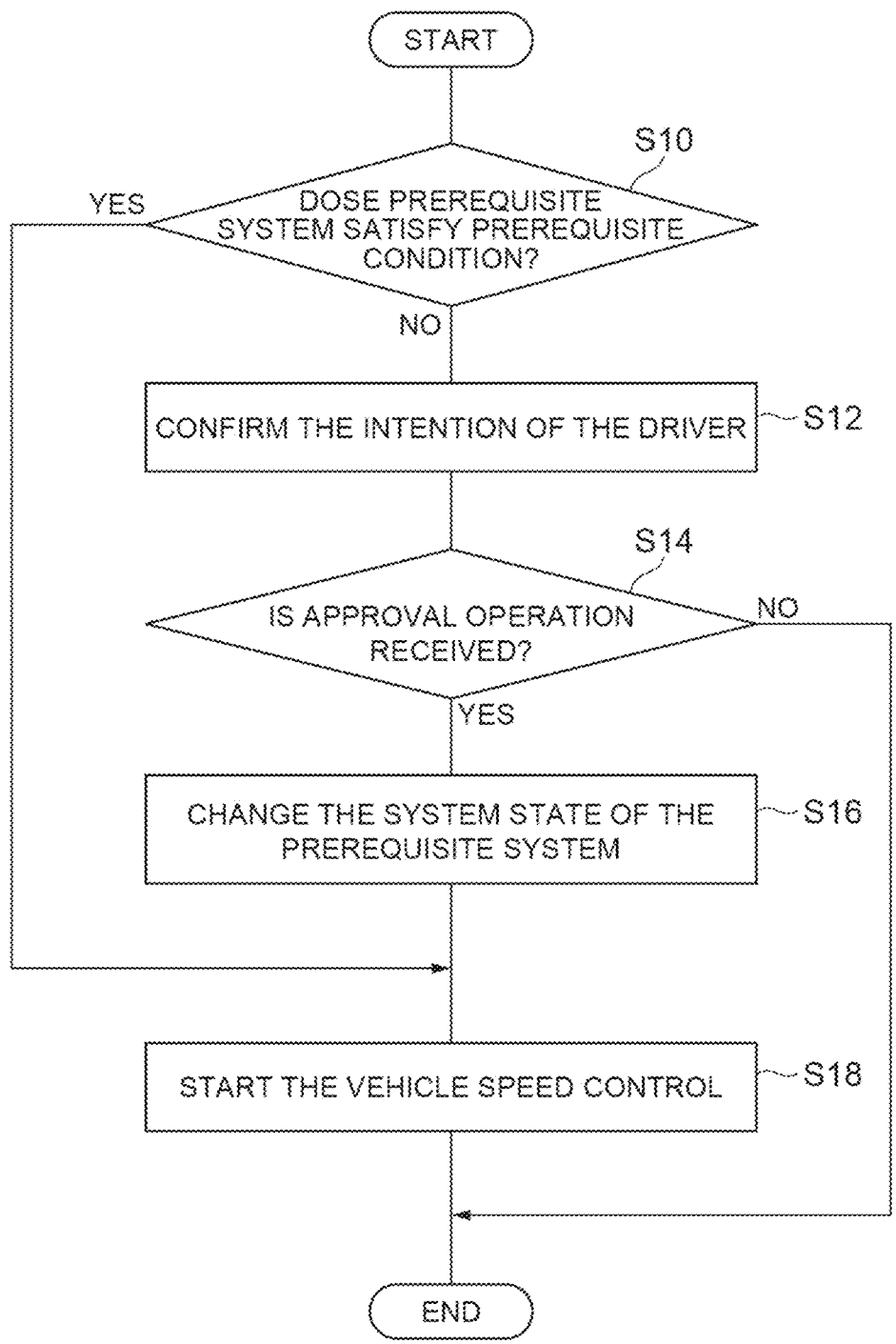
FIG. 3 is a flowchart illustrating an operation of the driving support device.

The operation of the driving support device 1 will now be outlined. FIG. 3 is a flowchart showing the operation of the driving support device, and FIGS. 4A to 4D are diagrams showing an example of notification to the driver. The flowchart shown in FIG. 3 is started when the vehicle speed control operation unit 7 of the driving support device 1 receives a start instruction operation of vehicle speed control.

As shown in FIG. 3, first, the prerequisite system setting unit 51 of the driving support device 1 determines whether the prerequisite system satisfies the prerequisite (step S10). First, the prerequisite system setting unit 51 specifies that the driving support control related to the start instruction operation is the vehicle speed control, refers to the definition stored in the prerequisite system DB 54, and acquires information of a prerequisite system of the vehicle speed control and a system state necessary at the start of the vehicle speed control. The prerequisite system setting unit 51 then obtains the current system state of the prerequisite system based on the signal output from the prerequisite system ECU 4. The prerequisite system setting unit 51 determines whether the current system state and the defined system state match. In the example of FIG. 2, "sideslip control is enabled", "tire slip suppression is enabled", "collision avoidance mitigation is enabled", "downhill support control is disabled", and "turn support is disabled" are start conditions of vehicle speed control. For each prerequisite system, the prerequisite system setting unit 51 compares the current system state with the defined system state to determine if there is a match. When there is a prerequisite system whose system state does not match even one of the defined prerequisite systems, the prerequisite system setting unit 51 determines that the prerequisite system does not satisfy the prerequisite condition. If the system states of all the defined prerequisite systems match, the prerequisite system setting unit 51 determines that the prerequisite system satisfies the prerequisite condition.

When it is determined that the prerequisite system does not satisfy the prerequisite (step S10: YES), the approval unit 53 of the driving support device 1 confirms the intention of the driver (step S12). The approval unit 53 causes the display device 9 to display an icon, message, image, or the like requesting approval.

Figure 4A:
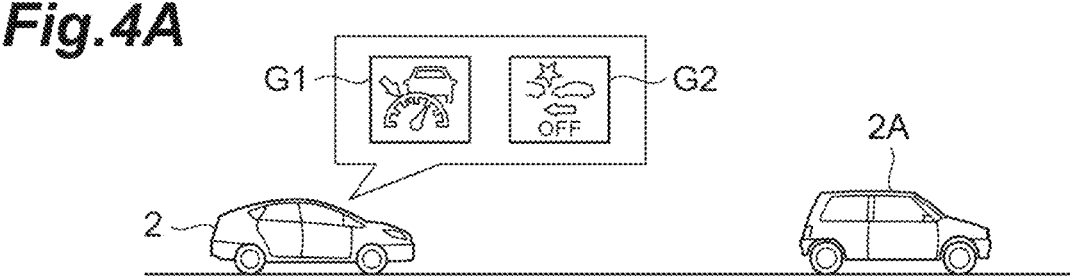
FIG. 4A is a diagram illustrating an example of notification to the driver.
Figure 4B:
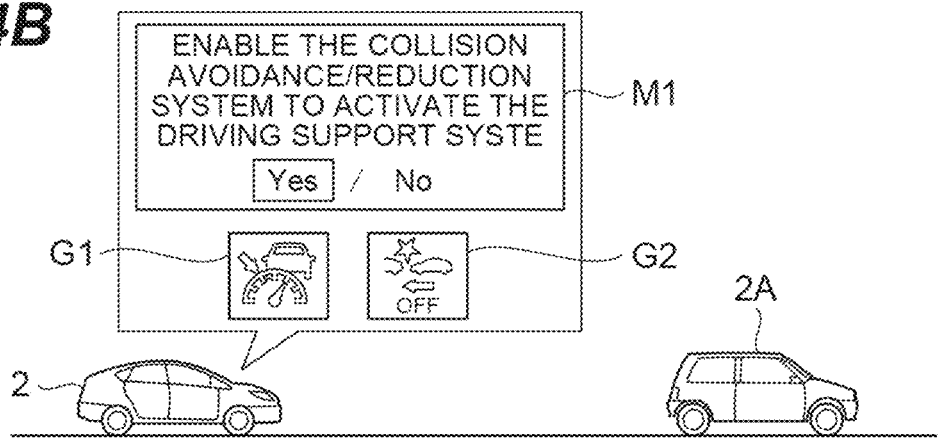
FIG. 4B is a diagram illustrating an example of notification to the driver.

FIG. 4A illustrates a situation before the vehicle speed control of the vehicle 2 is started in a situation in which the vehicle 2 and a preceding vehicle 2A are present. The balloon shown to the vehicle 2 is the display content of the display device 9. An icon G1 indicates that the driving support system of the vehicle speed control is disabled, and an icon G2 indicates that the collision avoidance mitigation system is disabled. When the vehicle speed control operation unit 7 receives the start instruction operation of the vehicle speed control and it is determined that the prerequisite system does not satisfy the prerequisite condition, the approval unit 53 displays a message M1 in the display device 9 as illustrated in FIG. 4B. The message M1 includes text that obtains the driver's approval for a change in the system state of the prerequisite system.

Figure 4C:
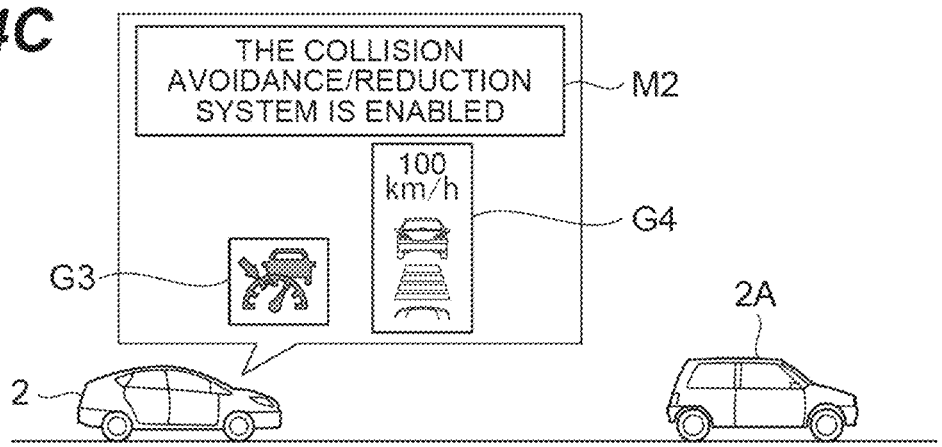
FIG. 4C is a diagram illustrating an example of notification to the driver.

Subsequently, the approval unit 53 determines whether or not the approval operation unit 8 has accepted the approval operation of the driver (step S14). When it is determined that the approval operation of the driver is received by the approval unit 53 (step S14: YES), the prerequisite system setting unit 51 changes the system state of the prerequisite system (step S16). For example, "tire slip suppression" is switched from "disabled" to "enabled", and "turn support" is switched from "enabled" to "disabled". Then, the vehicle speed control unit 52 of the driving support device 1 starts vehicle speed control (step S18), and the flowchart shown in FIG. 3 ends. At this time, as illustrated in FIG. 4C, the approval unit 53 may cause the display device 9 to display a message M2 indicating that the system state of the prerequisite system has changed, or may cause the display device 9 to display an icon G3 indicating that the vehicle speed control is enabled and a screen G4 of the vehicle speed control so as to understand that the vehicle speed control has started.

When it is determined that the prerequisite system satisfies the prerequisite condition (step S10: YES), the vehicle speed control unit 52 starts vehicle speed control (step S18), and the flowchart illustrated in FIG. 3 ends.

Figure 4D:
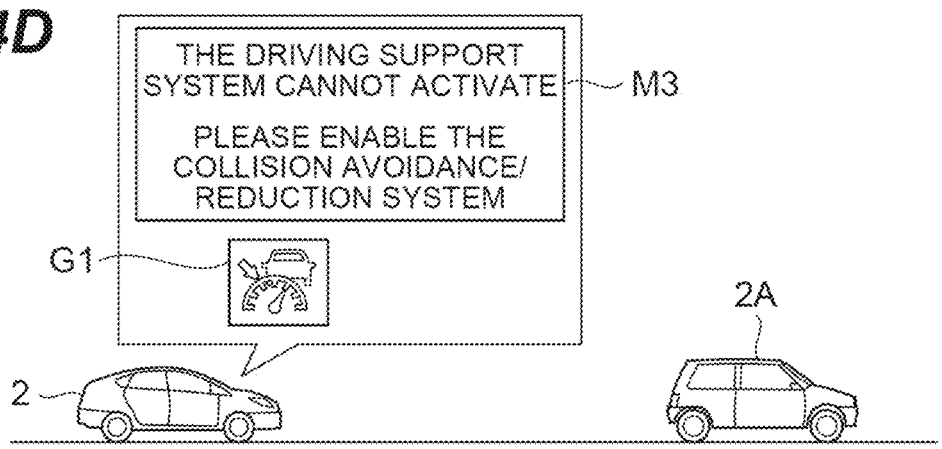
FIG. 4D is a diagram illustrating an example of notification to the driver.

When it is determined that the approval operation of the driver is not received due to the approval unit 53 (step S14: NO), the vehicle speed control unit 52 does not start the vehicle speed control, and the flowchart illustrated in FIG. 3 ends. At this time, as illustrated in FIG. 4D, the approval unit 53 may display a message M3 indicating that the vehicle speed control cannot be started. The message M3 may include a message prompting to enable the prerequisite system for which approval has not been obtained.

When it is not possible for the approval unit 53 to obtain the approval of the driver for the change of the system state of the prerequisite system for a certain period of time, the patient performs the same process as that in the case where the approval is not obtained. This prevents the system processing from stagnating.

Summary of Embodiment

According to the driving support device 1, in response to an operation of a driver of the vehicle 2 for starting driving support control such as vehicle speed control, information of a prerequisite system and a system state corresponding to the driving support system are acquired based on a definition. Then, it is determined whether the system state is enabled or disabled for each prerequisite system corresponding to the driving support control based on the signal from the prerequisite system ECU 4. A determination is made as to whether the determined system state matches the defined system state. The driver is requested to approve the change of the system state of the prerequisite system related to the system state determined not to match. In response to obtaining approval from the driver, the system state of the prerequisite system related to the system state determined not to match is changed, and driving support control is started. As described above, when the system state of the prerequisite system does not match the condition for starting the driving support control, the driver can be requested to approve the change of the system state. The driving support device may start the driving support control when the driving gap device receives the approval of the change of the system state. Therefore, the driving support device can suppress a reduction in opportunities to use the driving support control, and can improve the availability of the driving support control.

While exemplary embodiments have been described above, various omissions, substitutions, and changes may be made without being limited to the exemplary embodiments described above. For example, the sensors listed in the exemplary embodiments as the sensor group 3 are examples, and the sensor group 3 are not limited to the illustrated sensors. The prerequisite system ECU 4 is not limited to the sideslip control ECU 41 and the tire slip control ECU 42, and may not include these ECUs or may include other ECUs. The driving support device 1 may not the prerequisite system operation unit 6. The driving support device 1 may not the vehicle speed control operation unit 7. In addition, the ECU illustrated in FIG. 1 may be configured as one ECU in which a plurality of ECUs is integrated. The notification to the driver may be not only a display on the display device but also an audio output or vibration.

DESCRIPTION OF REFERENCE NUMERALS

1 . . . driving support device, 2 . . . vehicles, 4 . . . prerequisite system ECU (an example of a system controller), 5 . . . vehicle speed control ECU (an example of a support controller), 54 . . . a prerequisite system DB (an example of a storage device)

What is claimed is:

1. A driving support device comprising:
a support processor programmed to perform driving support control;
a memory connected to the support processor and configured to store a definition of at least one prerequisite control, the at least one prerequisite control being a prerequisite for starting the driving support control, the definition including the at least one prerequisite control and a system state of the at least one prerequisite control, the system state being either enabled or disabled, wherein the definition defines that a first prerequisite control of the at least one prerequisite control is to be enabled and that a second prerequisite control of the at least one prerequisite control is to be disabled; and
a system processor programmed to perform the at least one prerequisite control,
wherein the support processor is programmed to:
acquire information of a prerequisite control and a system state corresponding to the driving support control based on the definition in response to an operation of a driver of a vehicle for starting the driving support control;
determine whether the system state is enabled or disabled for each prerequisite control corresponding to the driving support control based on a signal from the system controller;
determine whether the determined system state and the defined system state match;
request the driver to approve a change of the system state for the prerequisite control related to the system state determined not to match; and
in response to obtaining approval from the driver, change a system state of the prerequisite control related to the system state determined not to match and starting the driving support control.

2. The driving support device according to claim 1, wherein the support processor is further programmed to notify the driver that the driving support control has been started in response to the driver approving the change of the system state and starting the driving support control.

3. The driving support device according to claim 1, wherein the support processor is further programmed to not perform the driving support control in response to not obtaining approval of the driver for a change of the system state.

4. The driving support device according to claim 1, wherein the at least one prerequisite control comprises a plurality of prerequisite controls, and the support processor is programmed to determine whether the determined system state and the defined system state match for each of the plurality of prerequisite controls.

5. The driving support device according to claim 1, wherein the support processor is programmed to request the driver to approve the change of the system state by displaying a message that identifies the prerequisite control for which the system state was determined not to match.

* * * * *